United States Patent [19]
Lee et al.

[11] Patent Number: 5,493,304
[45] Date of Patent: Feb. 20, 1996

[54] CALIBRATION SYSTEM FOR WIDE BAND ARRAY USING TRUE-TIME-DELAY BEAMSTEERING

[75] Inventors: Jar J. Lee, Irvine; Stan W. Livingston, Fullerton; Irwin L. Newberg, Northridge, all of Calif.

[73] Assignee: Hughes Aircraft Company, Los Angeles, Calif.

[21] Appl. No.: 315,007

[22] Filed: Sep. 29, 1994

[51] Int. Cl.$^6$ .............................. H01Q 3/00; H01Q 3/22; G01S 7/40
[52] U.S. Cl. .......................... 342/360; 342/173; 342/375
[58] Field of Search .................................... 342/360, 173, 342/174, 375

[56] References Cited

U.S. PATENT DOCUMENTS

| | | | |
|---|---|---|---|
| 3,378,846 | 4/1968 | Lowenschuss | 342/360 |
| 5,051,754 | 9/1991 | Newberg | 342/375 |
| 5,172,124 | 12/1992 | Becavin et al. | 342/360 |

OTHER PUBLICATIONS

"Student Guide for Basic Network Measurements Using the HP 8510B Network Analyzer System", Edition 3.0, Jan. 1988, HP Course No. HP 8510B+24D.

*Primary Examiner*—Gregory C. Issing
*Attorney, Agent, or Firm*—W. K. Denson-Low

[57] ABSTRACT

A calibration and diagnostic system and method for evaluating the performance of a wide band array utilizing a true-time-delay beamforming network. A short pulse typically on the order of a 2 nanoseconds is synthesized by transmission of a large number of discrete, equally spaced frequencies over the bandwidth over a short period of time, during which the system response (amplitude and phase) is measured and stored in a computer. The collected data is then transformed into the time domain to demonstrate the range resolution of the system. By signal injection with a built-in calibration system, the setting of each programmable delay line of the array can be calibrated. A fiber-optic test set is used as a transponder in the far field to perform complete end-to-end tests of the array system.

29 Claims, 10 Drawing Sheets

TIME RESPONSE AFTER TRANSFORMATION

FREQUENCY RESPONSE

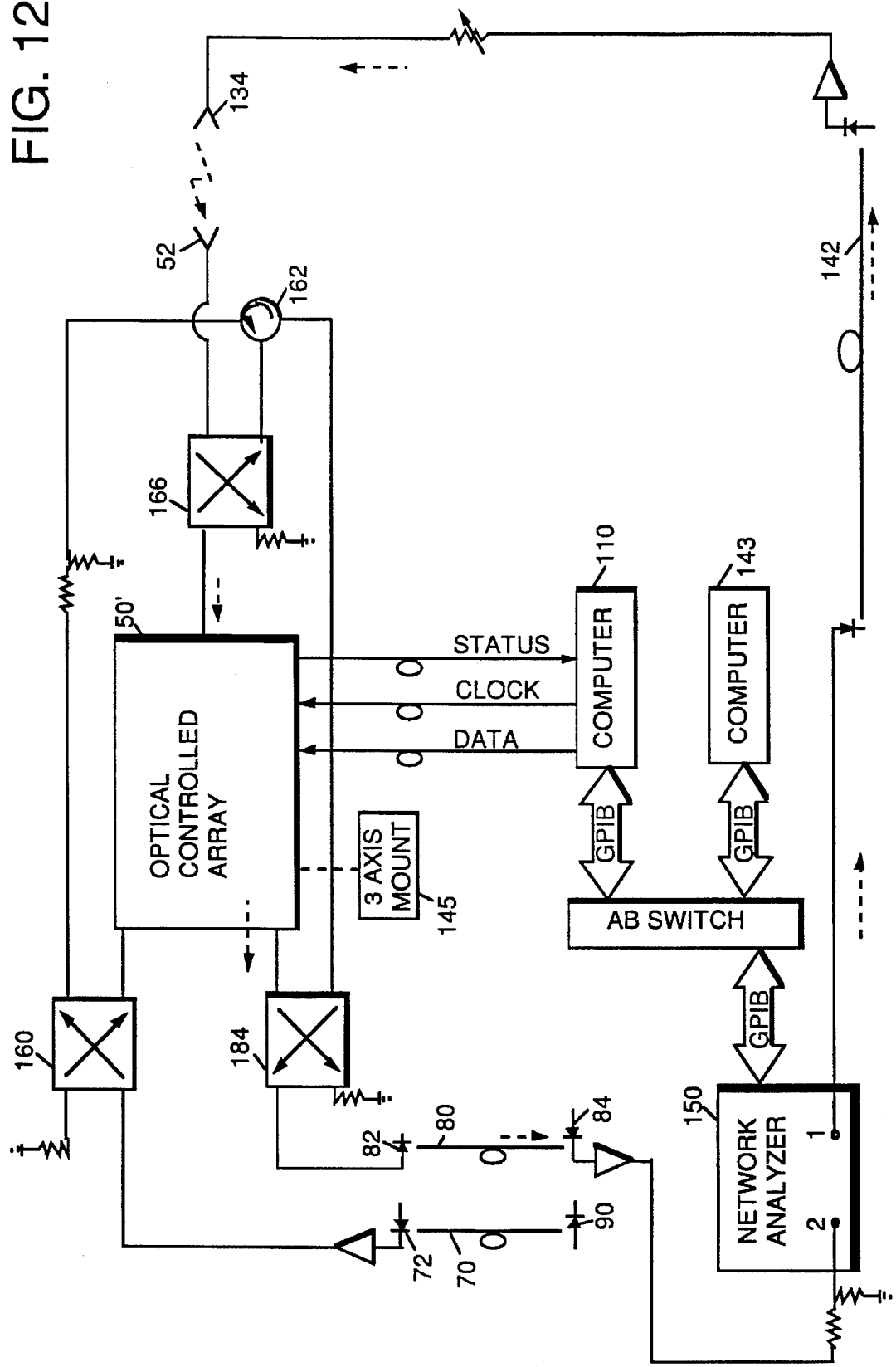

ness of the array.

CALIBRATION SYSTEM FOR WIDE BAND ARRAY USING TRUE-TIME-DELAY BEAMSTEERING

This invention was made with Government support under Contract F30602-91-C-0006 awarded by Rome Lab, Department of the Air Force. The Government has certain rights to this invention.

FIELD OF THE INVENTION

This invention relates to wide band array antennas using true-time-delay (TTD) beamforming networks, and more particularly to a calibration and diagnostic method and system to evaluate the performance of the array.

BACKGROUND OF THE INVENTION

Testing of an array antenna is typically conducted in the frequency domain, without an end-to-end test. Conventionally an array antenna is tested on an antenna range with a transmit source located in the far field. With the array under test mounted on a turntable, the receive power is recorded as a function of spatial angle at a given frequency. The plot so obtained is commonly known as an antenna pattern.

Increasingly fiber optic components are being used to construct wide band array antennas. A radar's range resolution can best be tested with a very short (~nanosecond) pulse. But generation and processing of such short pulses in real time can be quite costly, difficult, and inaccurate.

It would therefore represent an advance in the art to provide a system which allows testing, evaluation, trouble shooting and calibration of such wide band systems in a simple and cost effective way.

SUMMARY OF THE INVENTION

A method is described for testing a wide band microwave array antenna system operating over a frequency band, the array system including a true-time-delay (TTD) beam-forming network. The method includes the steps of transmitting a large number of test excitation signals at equally spaced frequencies covering said frequency band within a short period of time through the array antenna system, to thereby synthesize a very short test excitation pulse; measuring the system response to each of the test excitation signals and storing the system response data for each test excitation signal; and transforming the stored system response data for each test excitation signal into the time domain to demonstrate the range resolution of the system.

In accordance with another aspect of the invention, a method is described for monitoring and calibrating the time shift channels of a TTD beamforming network of a wide band array system. The method includes the steps of transmitting a large number of test excitation signals at equally spaced frequencies covering the frequency band through the time shift channels to thereby synthesize the generation of a very short pulse; offsetting the arrival times of the signals through the time shift channels to maintain separation of the transmitted signals through the channel; measuring the system response to each of the test excitation signals and storing the system response data for each test excitation signal; transforming the stored system response data for each test excitation signal into the time domain, the transformed data indicating the relative time shift introduced by the time shift channels.

BRIEF DESCRIPTION OF THE DRAWING

These and other features and advantages of the present invention will become more apparent from the following detailed description of an exemplary embodiment thereof, as illustrated in the accompanying drawings, in which:

FIGS. 11 and 12 are simplified schematic diagrams showing the transmit and receive far-field test configurations, respectively.

DETAILED DESCRIPTION OF THE PREFERRED EMBODIMENT

Efforts are underway to develop a wide band (50% bandwidth) radar array antenna supported by a fiber optic true-time-delay network, which would make use of the emerging photonic technology to enhance the radar system performance. Features of this technology include wide instantaneous bandwidth over a wide scan volume, low transmission loss for antenna remote control, and reduction of the physical size and weight. Among these features the wide instantaneous bandwidth is probably the most remarkable one that holds great potential for performance improvement in future radar systems. Beamforming based on coherent phase combining is intrinsically frequency independent. Wide instantaneous bandwidth is achieved by using time shifters in the feed network (instead of phase shifters as in beamforming based on coherent phase combining), realized by optical fibers and photonic components.

Figure 1A:
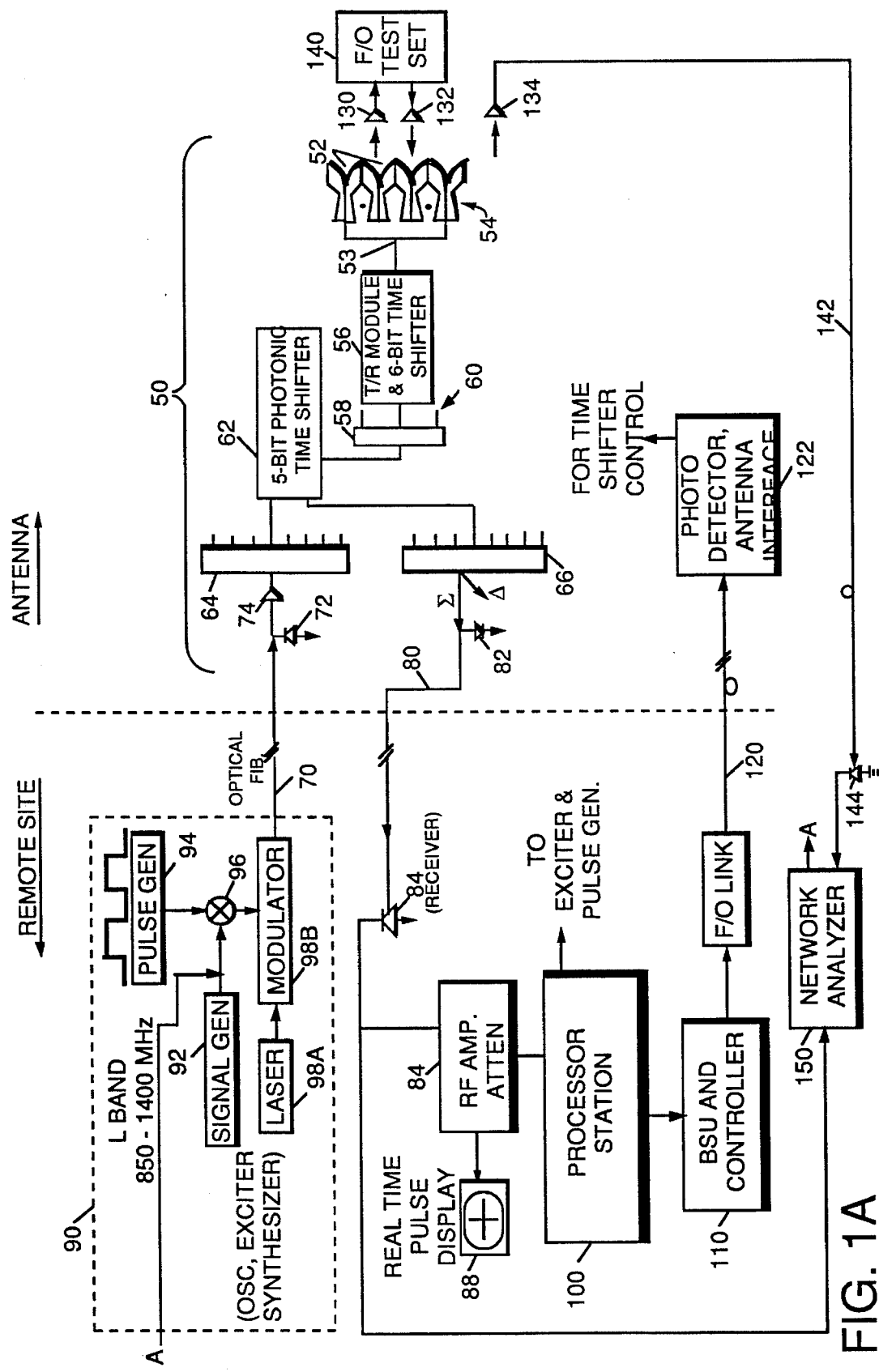
FIGS. 1A and 1B are schematic block diagrams illustrative of a wide band array antenna to which the present invention is applied.
Figure 1B:
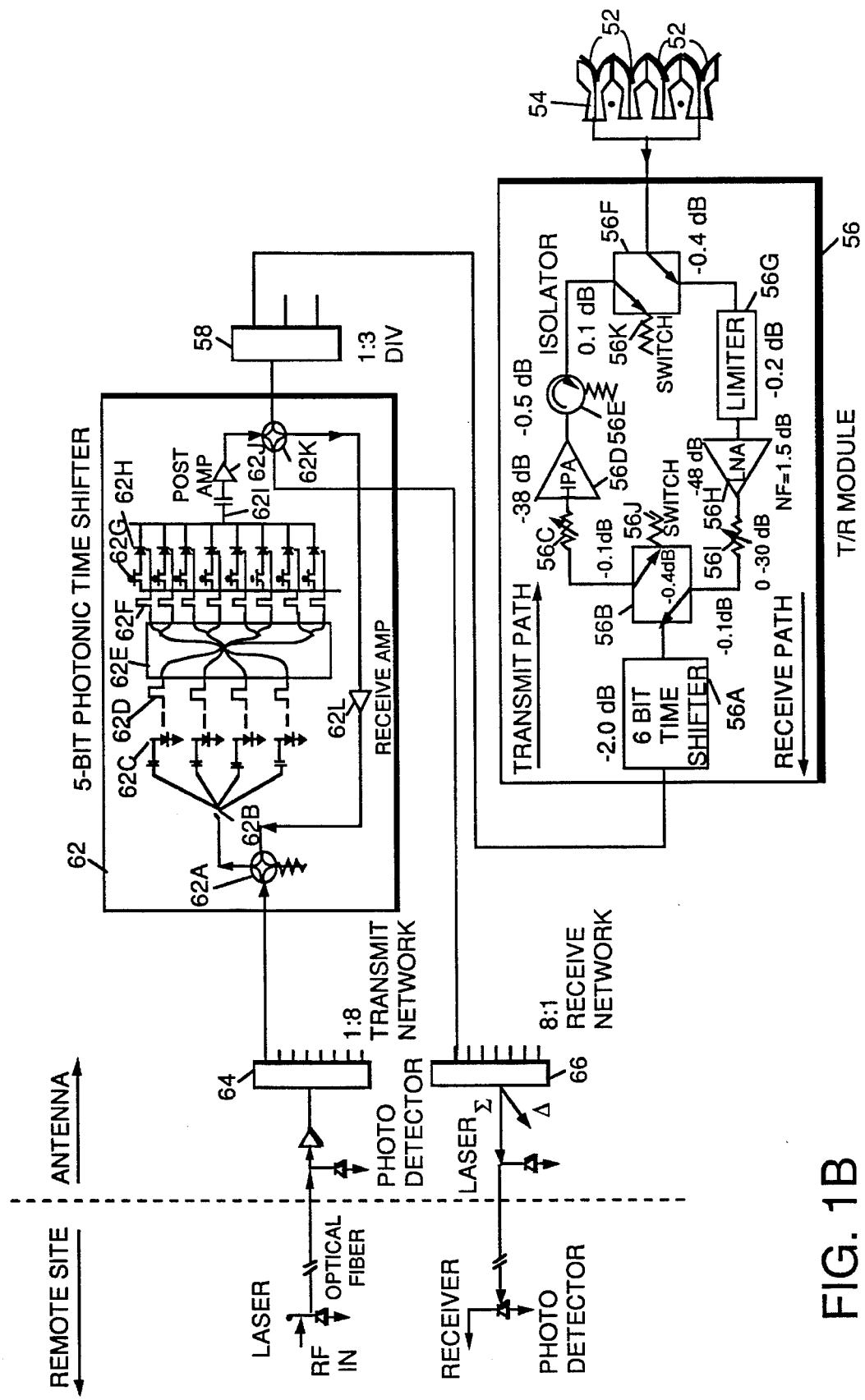

An exemplary 2-D photonic array to which this invention is applied is shown in simplified schematic form in FIGS. 1A and 1B, and includes 4×24 wideband radiating elements 52 distributed over a 3 feet by 9 feet conformal aperture, which follows the contour of a jumbo jet fuselage. The 96 elements are divided into 24 linear columns 54, with each column supported by a transmit/receive (T/R) module 56. Every three columns are grouped by a 1:3 divider/combiner 58 into one subarray 60 controlled by a 5-bit fiber optic (F/O) time shifter 62 whose smallest bit is about 0.5 nanosecond. Each F/O time shifter includes laser upconversion elements to upconvert the RF signal and a plurality of selectable fiber optic delay lines of different lengths to provide the time delay capability. A five bit F/O time shifter thus has 32 selectable discrete delay values. The delayed signals are then downconverted to RF frequencies. Within each T/R module 56 there is another 6-bit electronic time shifter 56A to provide the short delays within one wavelength.

This exemplary array 50 operates at L-band from 850 to 1400 MHz with a 50% instantaneous bandwidth, capable of transmitting and receiving over a scan range of ±60° in the azimuth plane. The range resolution of the array, i.e., its resolution in determining the range of a target from the array, is nominally 30 cm. The array 50 is designed and constructed to be a self-contained radar antenna, which can be interfaced with other signal processing equipment. Through RF and digital fiber optic links, the array antenna can be controlled for beam scan from the keyboard of a PC computer at a remote site.

In the exemplary system shown in FIG. 1, the F/O time shifter 62 has an input for receiving a transmit signal from a 1:8 corporate transmit feed network 64, and a receive signal output at which time-delayed signals received from the radiator elements 52 are output to an 8:1 receive network 136 which produces sum and difference output signals. The networks 64 and 66 are connected via optical fiber transmission links 70 and 72, which may be on the order of one kilometer in length or even longer, to transmitter and receiver equipment located at a remote site.

The transmitter 90 includes a signal generator 92 for synthesizing an RF carrier signal in the L-band between 850 and 1400 MHz, in this exemplary embodiment. The carrier signal is applied to a signal mixer 96 for mixing with a pulse signal from pulse generator 94. The mixer output is applied to modulator 98B to modulate the optical signal generated by laser 98A. The modulated optical signal from modulator 98B is injected into the optical fiber 70 for transmission to the antenna 50, where a photodetector 72 converts the optical signal to RF, and an amplifier 74 amplifies the recovered Rf signal. The amplified signal is then input into the 1:8 transmit network.

On the receive side, the RF sum signal from the receive network 66 is upconverted to an optical carrier frequency by a laser/modulator 82, and the modulated optical signal is injected into the optical fiber 80 for transmission to the remote site receiver equipment. At the remote site, the optical energy from the fiber 80 is downconverted by a photodetector 84, and fed through an RF attenuator 86 to a processor 100 and to a real time pulse display 88. The processor 100 typically includes a personal computer or work station, including a processor apparatus and a monitor. Outputs from the processor 100 control the signal generator 92, pulse generator 94 and beam steering unit and controller 110, and provide timing control. The beam steering unit and controller 110 output is converted to an optical carrier frequency and transmitted by a digital fiber optic link 120 to a photodetector, antenna interface unit 122 for time shifter 62 control.

FIG. 1B illustrates the F/O time shifter 62 and the T/R module 56 in further detail. The time shifter 62 includes a transfer RF switch 62A which receives the input signal from the transmit network 64, and transmits the input signal to a 1:4 selector switch 62B. The signals from the switch are passed to the selected channel, converted to optical frequencies by laser diode 62C, passed through optical fiber delay line 62D (the channels include lines of different length) to an optical 4:8 star coupler 62E, whose outputs are passed through eight optical fibers of different length to photodetectors 62H to downconvert the signals to RF. Transistor switches 62H are used to select the delay line length, by determining whether a particular photodetector 62H is operational. The RF signals are combined at 1:8 combiner 62I, amplified by amplifier 62J and passed through RF transfer switch 62K to the time delay device output, where the signal is passed to the 1:3 divider 58. Devices 62K and 62A provide a path for the return energy to be sent through the delay lines as well, since the optical path is not reciprocal. For this purpose a receive RF amplifier 62L is included in the delay device 62.

The T/R module 56 includes a 6-bit electronic time shifter 56A, and RF switches 56B and 56F to route the signals between the transmit and receive paths within the module. The transmit path includes a variable attenuator 56C, a high power amplifier 56D, and an isolator 56E. The receive path includes a limiter 56G, a low noise amplifier 56H and a variable attenuator 56I.

A unique feature of this F/O array 50 is the wide instantaneous bandwidth (550 MHz) with a range resolution of 30 cm. To test the bandwidth of the system, a transmission test using a 2 nanosecond pulse would be desirable. However, since it is difficult to generate such short pulses to excite the array antenna, a technique based on Fourier synthesis is used to test the system.

Assume that N frequencies (N~400) equally spaced over a 550 MHz bandwidth are excited simultaneously, then a train of 2 nanosecond pulses will be transmitted in real time. To study the system response, the short pulses are injected into the array antenna and radiated into the free space. A network analyzer 150 at the remote site can provide the pulses applied at mixer 96 at A, substituting for the output of the signal generator 92. A gain horn 134 in the far field will receive the signal, which is routed back to the network analyzer 150 at the test site through a F/O link 142 with a photodetector 144 for downconverting the optical energy. By studying the time sidelobes and the broadening of the received pulses one can determine the bandwidth and the range resolution of the array system 50. This analysis is well known in the art; for example, the broadening of the received pulse is inversely proportional to the system bandwidth.

It should be noted that all these frequency components need not be transmitted simultaneously; the components can be transmitted one at a time as long as the network analyzer 150 can store up the test results at each frequency accordingly. In the far field test the network analyzer is basically performing an S12 insertion measurement with the free space included in the two port network. The measurement provides amplitude and phase information at each frequency and the collected data can be transformed into the time domain off line by a network analyzer such as the model HP8510 marketed by Hewlett-Packard Company. The synthesis of a short pulse by a sequence of its frequency (CW) components is known in the art, and the network analyzer 150 can be programmed to excite these frequency components and perform the signal transformation at the receive end. Such synthesis is described, for example, in the Hewlett-Packard documentation entitled "Student Guide for Basic Network Measurements Using the HP 8510B Network Analyzer System," Edition 3.0, January 1988, HP Part No. 08510-90135, pages 3.1-1 through 3.9-1.

The method can also be used to measure the system response of the receive path. By switching the direction of the signal, the signal can be sent to the far field through a F/O link, so that a plane wave can be transmitted by a gain horn to test the antenna 50 in a receive mode.

Figure 2A:
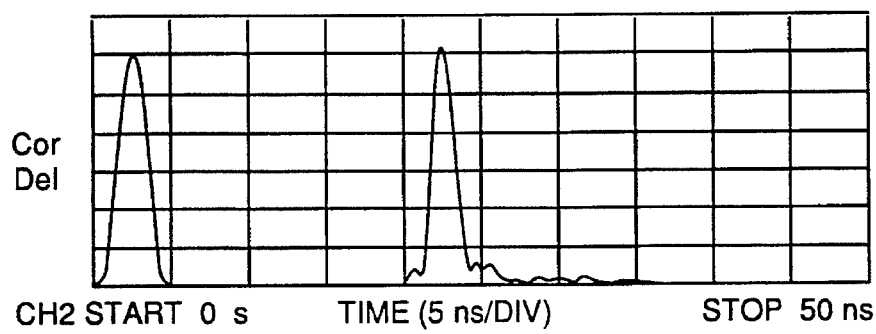
FIG. 2A is a waveform of the round trip impulse response of one subarray comprising the array of FIG. 1.
Figure 2B:
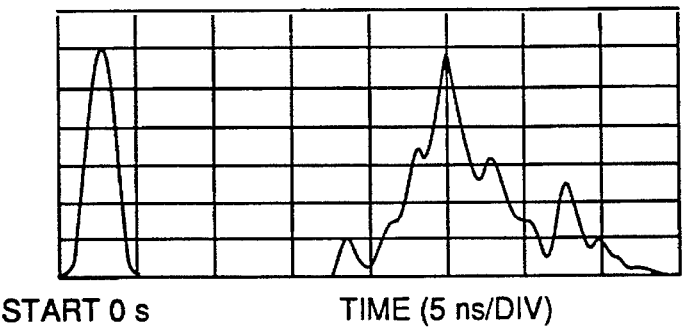
FIG. 2B is a waveform of the round trip impulse response of a conventional limited bandwidth radiating array.

As an example, the pulse synthesis scheme was applied to test the range resolution of the F/O array 50. FIG. 2A shows the round trip impulse response of a 3×4 subarray of the F/O antenna 50 pointing at a large flat plate located just outside of the near field. In this case, the network analyzer 150 provides the excitation signals which are conveyed to the transmit input of the antenna array through the F/O link 70. The receive output of the array 50 is in turn conveyed through F/O link 80 and connected to the network analyzer for analysis. For comparison, FIG. 2B shows the similar response of a conventional L band 2×4 array of patch elements with only a 10% bandwidth. In each case, the first pulse is the input reference pulse, and the second pulse is the pulse received after the round trip. Distortion and pulse broadening can clearly be seen in the band-limited case of FIG. 2B.

A radar antenna can be tested by providing an ideal target return generated by a retrodirective corner reflector placed in the far field. But the drawback of this approach is that ground clutters and multipath signals will corrupt the target return, making it difficult to deduce the true system response. This problem can be alleviated by using a transponder test set with a built-in F/O delay line. The key feature is to set a very long delay so that by the time the signal is transmitted back, ground clutter and other backscattering from the transmit pulse have long disappeared. Thus, the two-way, round-trip response of the system 50 as a radar can be tested by operating a F/O test set 140 in the far field as a transponder, i.e., as a repeater, which amplifies the signal received on gain horn 130 and retransmits the amplified signal through gain horn 132.

Figure 3:
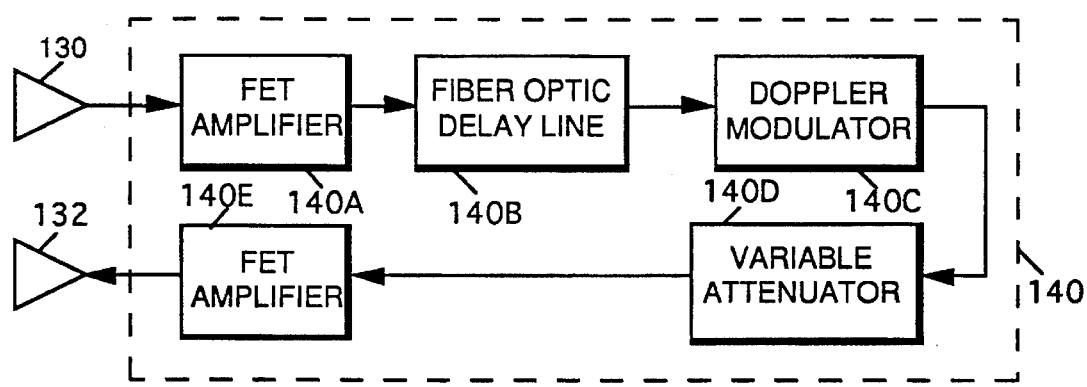
FIG. 3 is a schematic block diagram of a fiber optic test set useful for testing the array of FIG. 1 in accordance with the invention.

FIG. 3 is a block diagram of the F/O test set 140, which comprises a F/O delay line 140B with respective RF amplifiers 140A and 140E at the input and output of the test set. The F/O delay line 140B includes a light source (laser) that can be modulated by the input RF signal, a long link of optical fiber that can produce the time delay, and a light receiver (photodetector) that demodulates the light signal to obtain a replica of the input modulation delayed in time. Both Doppler frequency and amplitude control can be added, by means of Doppler modulator 140C and variable attenuator 140D, to simulate a moving target. Test targets at different ranges and moving speeds either incoming and outgoing can be achieved by switching in different delays in proper sequence. Jamming signals may also be inserted prior to sending back the target return, e.g., via a coupler between the delay line 140B and the modulator 140C. The test set 140 provides a delayed replica of the transmitted signal to allow the round trip response of the system to be evaluated.

To test the array bandwidth, a one-bit delay line in the test set 140 with a few nanosecond's range resolution will be used as delay line 140B; the one-bit delay line has two delay lines, a relatively short delay on the order of a few nanoseconds, and a relatively long delay on the order of several hundred nanoseconds. The relatively short delay line can be switched in or out upon command. For the round trip test, the long time delay will isolate the coupling and oscillation in the loop between the receiving and transmitting horns located side-by-side in the far field. Another purpose of this delay, of course, is to provide a time reference for the target return. Here again, the short pulse is synthesized by transmitting a large number of frequency signals as excitation signals, using the network analyzer 150. The excitation signals are transmitted to the far field, received by the transponder, delayed, and retransmitted back to the array 50, where the signals are received, passed through the receive path and returned to the network analyzer 150 for analysis. Tests will be conducted under the condition that the short delay is switched out, and under the condition that the short delay is switched in. The resulting waveforms from the two tests are compared, e.g., superimposed, to determine whether the array under test can resolve the small additional delay.

Figure 6:
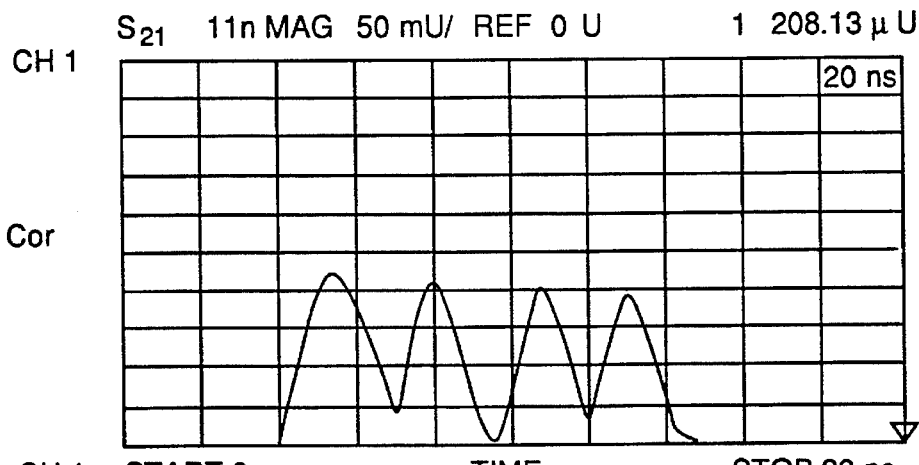
FIG. 6 illustrates the time response of the system of FIG. 4 after Fourier transformation.
Figure 4:
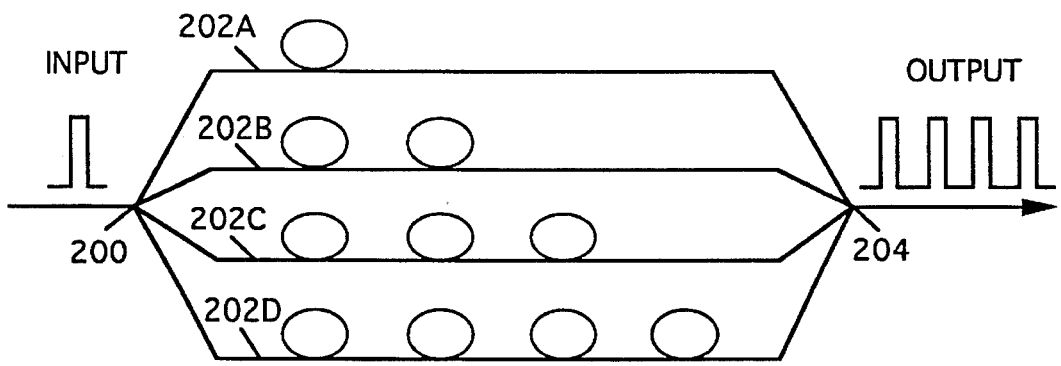
FIG. 4 is a simplified block diagram of a multiple-cable system illustrative a calibration technique in accordance with the invention.
Figure 5:
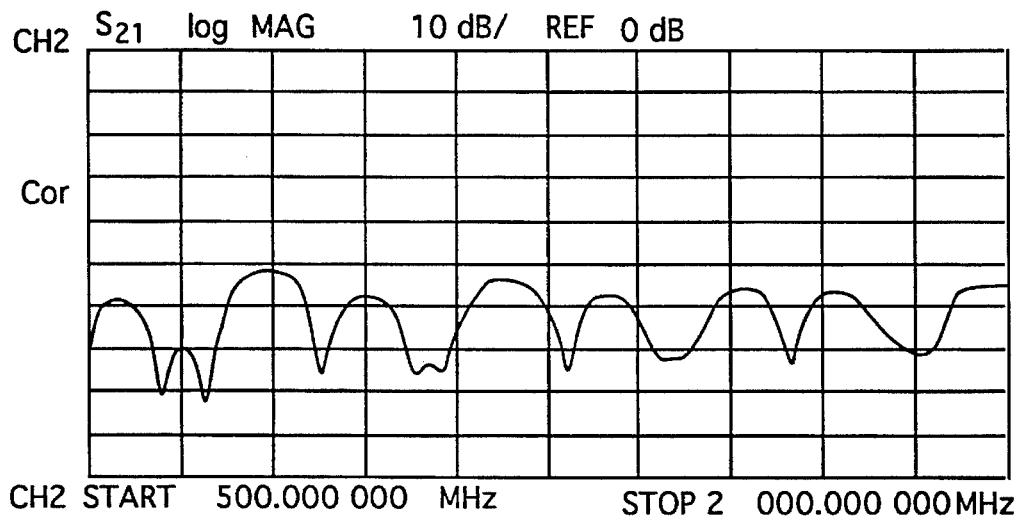
FIG. 5 illustrates the frequency response of the system of FIG. 4.

Besides bandwidth and range resolution tests, the wide band technique can also be applied to calibrate the time shifters of the beamforming network. This is demonstrated by the simple example shown in FIG. 4. Here, a 1:4 power divider 200 distributes an input pulse signal into four cables 202A-D of different lengths. The cable lengths are consecutively offset by about 50 cm, and the outputs are recombined by a 4:1 combiner 204. Port 1 and port 2 refer to the input and output ports of the assembly. The insertion loss (S12) of this cable is measured at 400 points from 0.5 to 2.0 GHz, with the magnitude of S12 shown in FIG. 5. When this frequency response is transformed into the time domain, a trace with four pulses as shown in FIG. 6 is observed. It can be seen that the synthesized input pulse is split into four pulses, with each pulse propagating through a different length of cable leading to different arrival times. From the delays of successive pulses, the differences in the cable lengths can readily be determined, taking into account the known propagation speed of signals through the cables. In addition, from the amplitudes of the pulses, the insertion loss of the corresponding transmission lines can be estimated.

This pulse measurement technique can be used to calibrate the time shift channels of the array antenna 50. To achieve this purpose, a built-in wide band calibration system is incorporated in the F/O array antenna 50. As noted, the array comprises twenty-four columns 54 of wide band elements 52, grouped into eight subarrays, with each subarray controlled by a F/O delay line 62. The calibration system is designed to check out these eight F/O time shift channels. The eight channels can be checked one at a time with a 1:8 multiplexing switch to isolate a given channel, or monitored simultaneously by using a series feed to inject the signal into these eight channels. In the latter case the time separation between the couplers of the series feed must be adjusted to offset the arrival times of the pulses through these channels.

Within each subarray, a series feed is used to inject the signal into the three radiating element columns. To provide sufficient delay between adjacent columns for resolution, a cable (~50 cm) is inserted between them as part of the series feed. The coupling is kept very small (~30 dB) so that the calibration system does not perturb the normal operation of the antenna. The injected signal will trace the receive path of the antenna, going through the T/R module 56, F/O time shifter 62, power combiner 66, and back to the receiver. The insertion loss (S12) of each channel is measured at 400 frequencies over the wide frequency band of interest, in this case 850-1400 MHz. The collected data, amplitude and phase will then be transformed into the time domain in which the time delay and pulse distortion through the channel can be analyzed.

So far the signal injection technique has been described in the direction of receive path; however, the method is also applicable to the transmit path. In fact, since the transmit path contains the power amplifier which is more costly than the LNA, the primary purpose of the calibration system for this exemplary system is to test the components in the transmit path, including the F/O delay line 62, and the high power amplifier and RF switches comprising the T/R module 56. In this case the series feed serves as a receiving or signal collection device instead of an injection device in the calibration system.

Figure 7:
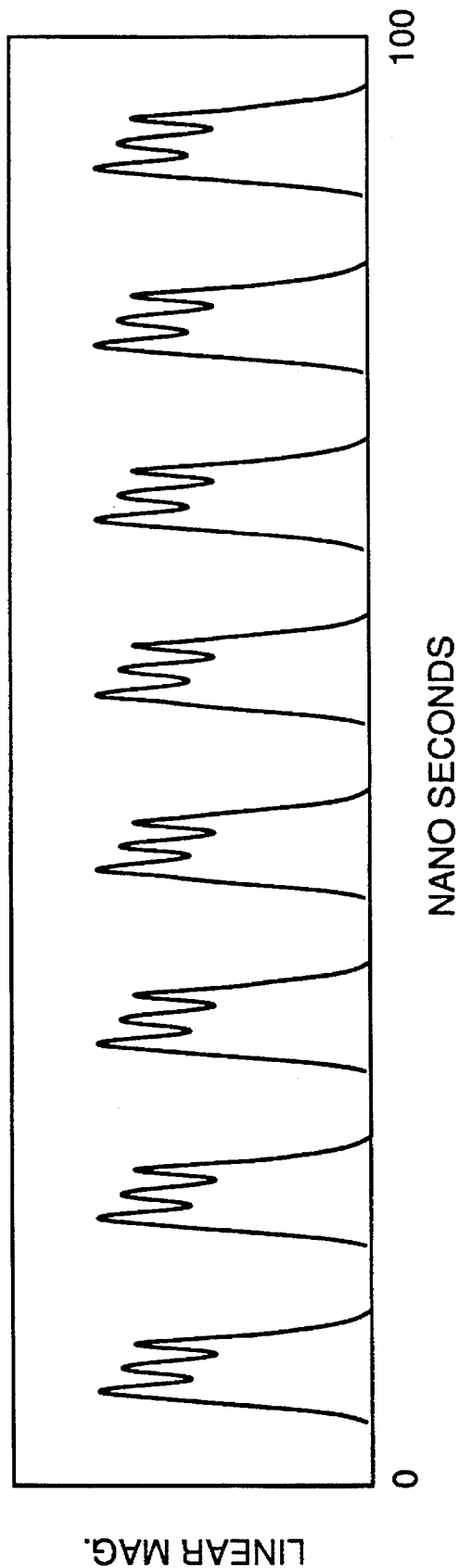
FIG. 7 is a plot illustrating the time impulse response of the array system of FIG. 1.

If a series feed is used to monitor all eight F/O channels sequentially, a trace of eight groups of pulses will be seen after Fourier transformation, as illustrated in FIG. 7. Within each group, three peaks contributed by the three columns of radiating elements can be seen. The decrease in amplitude of the pulses results from the loss in the series feed of the injection system.

Figure 8:
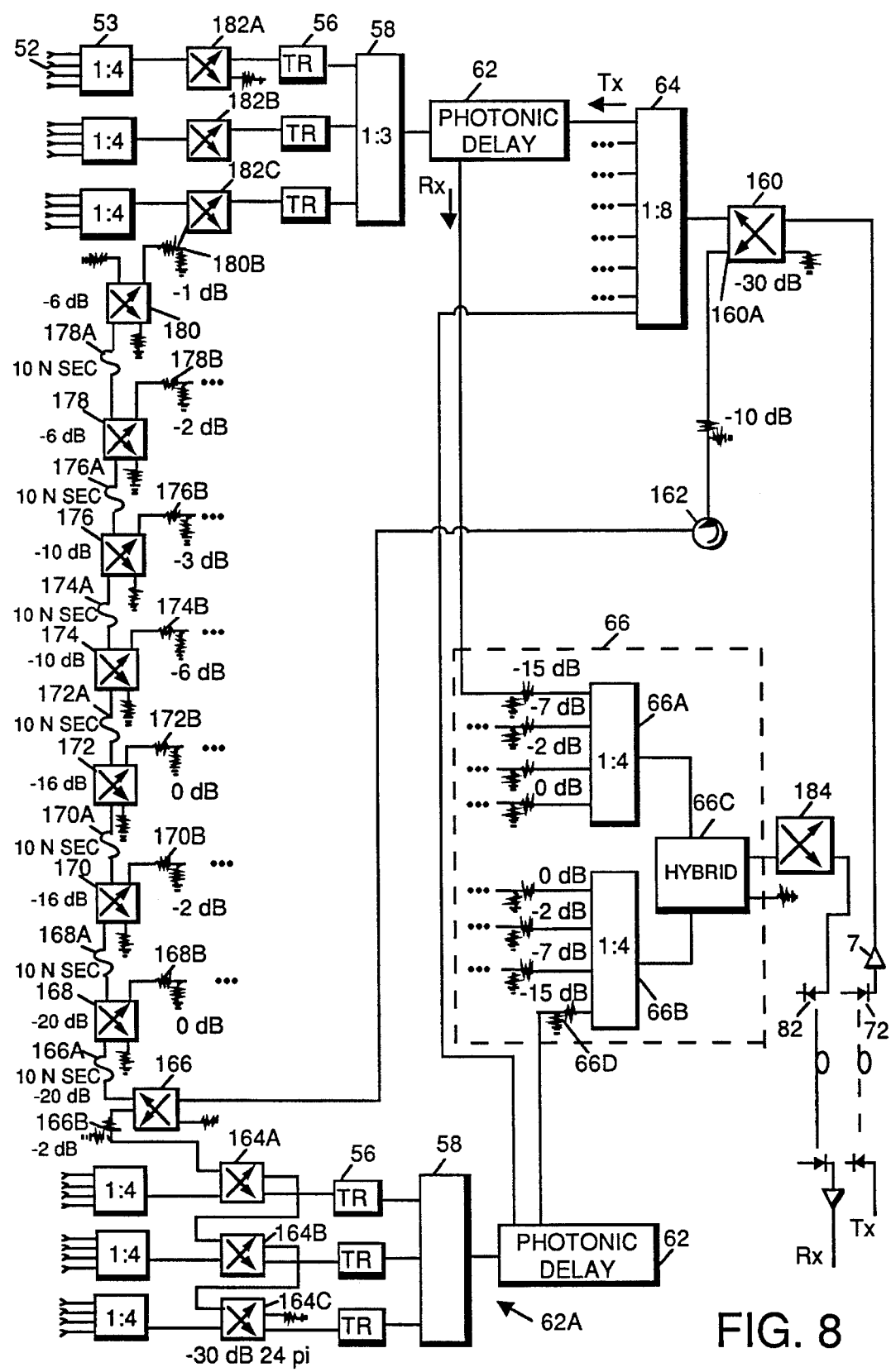
FIG. 8 is a schematic illustrating an exemplary built-in test system for the array of FIG. 1.

An exemplary built-in test system for testing the wide band array system of FIG. 1 is shown in schematic form in FIG. 8. The system includes a network of couplers arranged as the series feed for the test signals. In the transmit path from the amplifier 74, a 30 dB hybrid coupler 160 is employed to couple off a small portion of the transmit signal. The coupler includes a coupled port 160A which couples off a signal at −30 dB level from the signal applied to the transmit feed network 64. The coupled signal is passed through a circulator 162 and through a series of eight hybrid couplers 166–180 for passing a small portion of the transmit signal toward the receive path of the array system. A delay of about 15 nanoseconds is incorporated in the series path between adjacent couplers by transmission line lengths 166A–178A. The coupling factors of the respective hybrid couplers 166–180 are selected to provide each subarray 60 of three T/R modules and radiating elements with a test signal of known relative amplitude, based on the known loss through the series feed. Thus, couplers 166 and 168 have 20 dB coupling ratios, couplers 170 and 172 have 16 dB coupling ratios, couplers 174 and 176 have 10 dB coupling ratios, and couplers 178 and 180 have 6 dB coupling ratios. To achieve a desired power division among the various subarrays, attenuators 166B–180B are provided.

The signal from each subarray coupler 166–180 is in turn introduced into a series path of three couplers to couple off about one third of the power supplied to the subarray to each T/R module 56 comprising the subarray. Thus, for example, the coupled signal from coupler 166 is supplied to the series of couplers 164A–164C, each of which couples approximately one third of the power to a corresponding T/R module 56. Similarly, the output of the coupler 180 is provided to the series of couplers 182A–182C, for splitting of the power from coupler 180 into three signal components for the corresponding three T/R modules.

Figure 9:
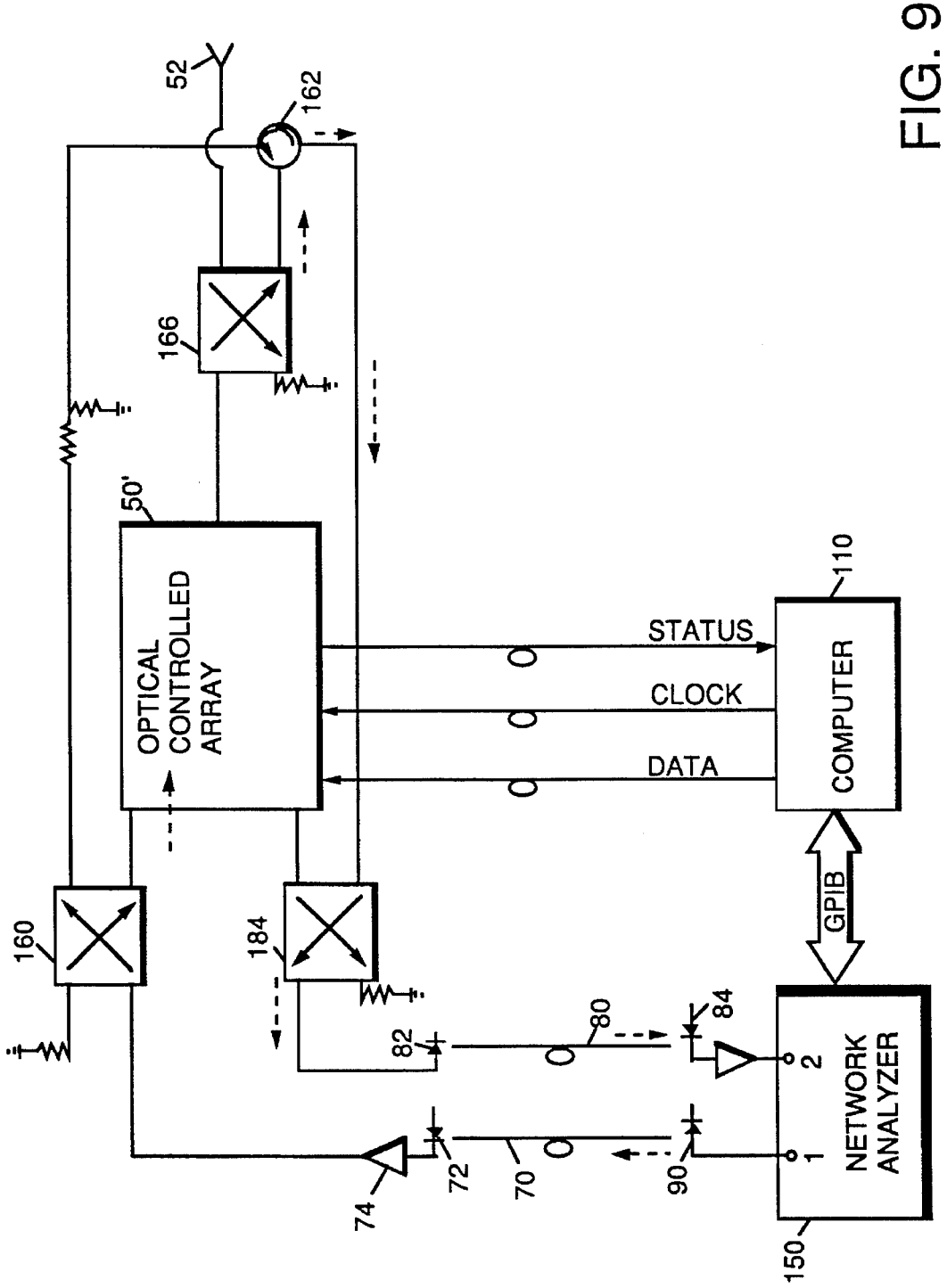
FIG. 9 is a simplified schematic block diagram illustrating the configuration of the built-in test system with the array of FIG. 1 for testing the transmit channel elements.

FIG. 9 is a simplified schematic block diagram of the built-in test system setup for the transmit path calibration. Here, block 50' indicates the optical controlled array 50 less the radiating elements 52 and 1:4 couplers 53. In this configuration, the T/R module switches 56B and 56F are set by computer 110 to select the transmit channel path through attenuator 56C, amplifier 56D and isolator 56E. The network analyzer 150 is set to generate separately the multiple test signals, e.g., 400 different signals of equally spaced frequencies covering the 850–1400 MHz band. The test signals are passed through the optical link comprising transmitter 90, optical fiber link 70, are downconverted to RF at photodetector 72, amplified and passed to the hybrid 160. In this configuration, the test signals are passed through the array 50' including the transmit path through the T/R module. The coupled signal from coupler 160 is passed through circulator 162 to the T/R module 56 and into the load 56K connected to the switch 56F. The signal of interest from the array 50' passes into the coupler 166 and out to the circulator 162, to the coupler 184, and back to the analyzer 150, as indicated by the signal direction arrows in FIG. 9.

Figure 10:
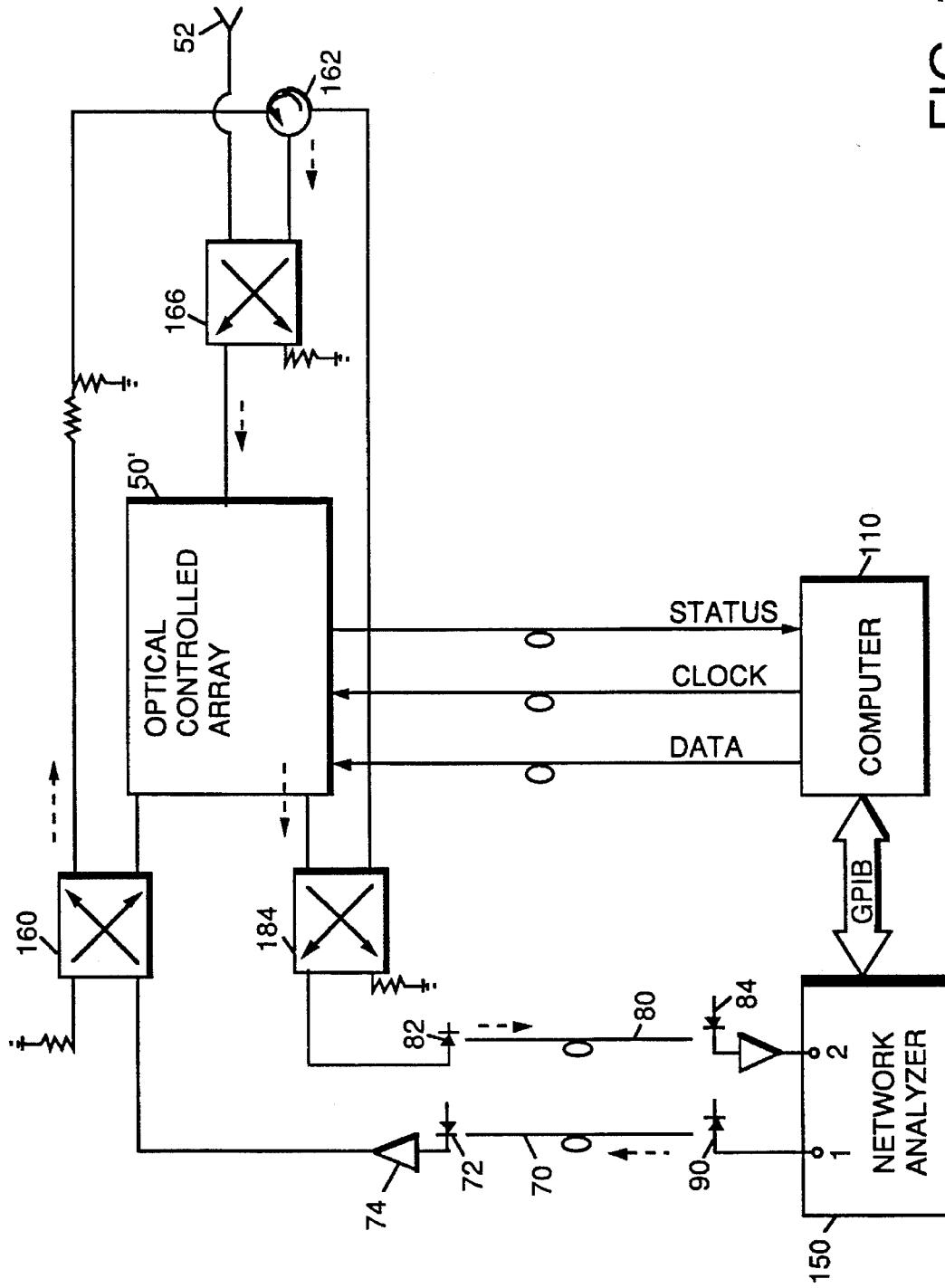
FIG. 10 is a diagram similar to FIG. 10 but showing the configuration for testing the receive channel elements.

FIG. 10 is similar to FIG. 9, but shows the built-in set system and array 50' in the test receive configuration. Here, the RF switches 56B and 56F in the T/R module 56 are set by computer 110 as illustrated in FIG. 1B to select the receive path. Once again, the signal direction arrows in FIG. 10 illustrate the direction of the test signals from the network analyzer 150. In this configuration, the signals injected directly into the array 50' from coupler 160 are absorbed in the load connected to a port of transfer switch 62A. The test signal of interest for testing the receive channel is injected into the hybrid 166 via the circulator 162, and then into the series feed path to the next channel into the various T/R modules 56 and optical time shifters 62. The output from the array 50' passes into the hybrid 184 and back to the network analyzer 150.

For both the transmit and receive tests, the computer 110 typically operates in cooperation with the network analyzer to test the array under various time delay configurations for the time shifters 62, and as well for the various setting of the phase shifters of the T/R modules, if desired. Thus, for this example, a very short excitation pulse is synthesized for each of the 32 possible time delays of the time shifters 62, in order to test and calibrate the different time shift settings.

Figure 11:
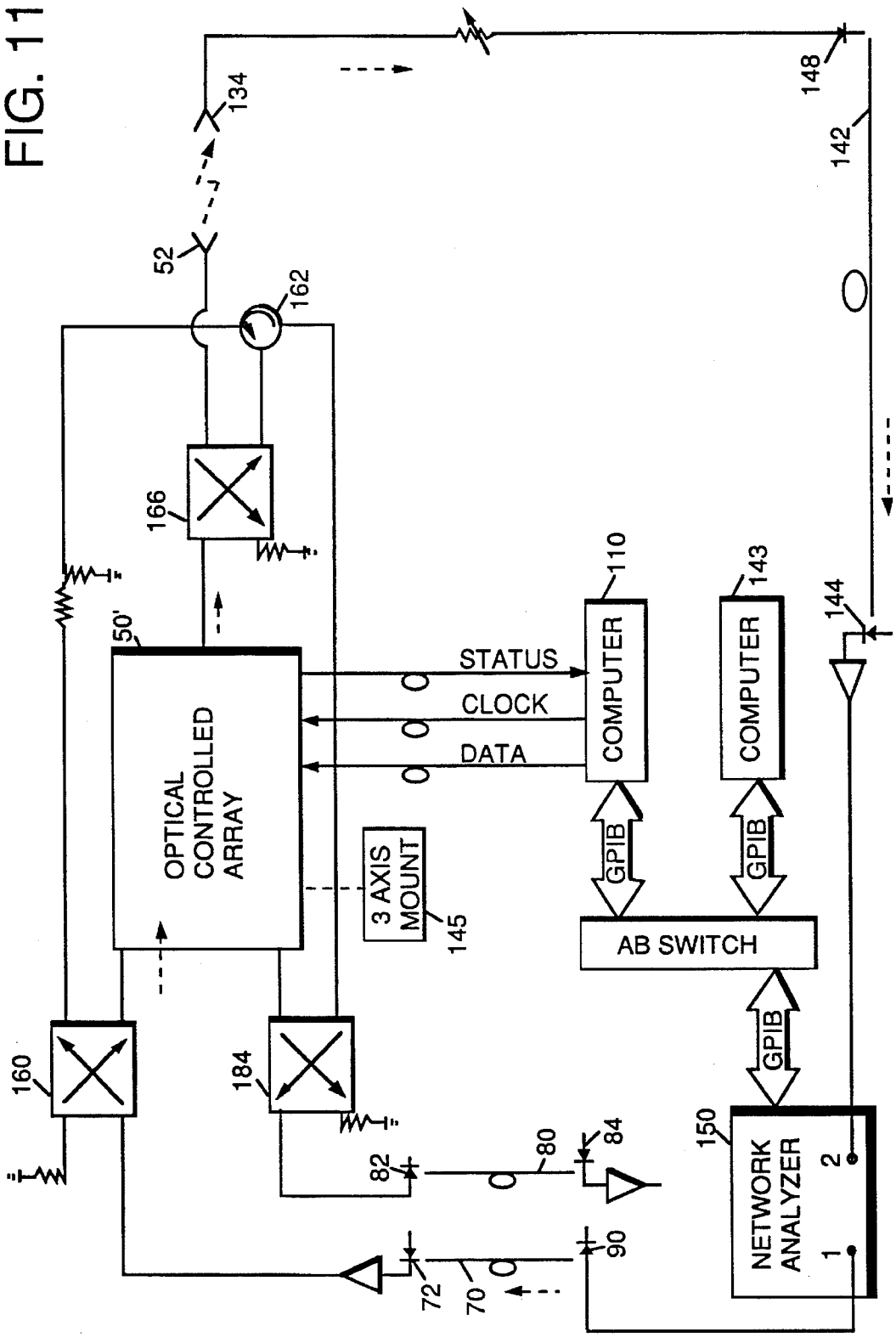

FIGS. 11 and 12 illustrate test configurations for far field testing of the transmit and receive functions. Here again, the signal direction arrows indicate the direction of the test signals through the system. In the transmit configuration of FIG. 11, the network analyzer generates the excitation signals to synthesize the very short pulse, which are communicated through the F/O link 70, through the coupler 160 into the transmit path of the array 50', through the coupler 166 to the radiating elements 52, where the excitation signals are radiated into free space. An antenna 136 in the far field receives the radiated excitation signals, the received signals are converted to optical signals by laser 146, which traverse the optical link 142 back to the remote site, where photodetector 144 downconverts the optical signals to RF, for analysis by the network analyzer. In this case, the array can be mounted on a 3-axis mount 145 controlled by computer 143 for positioning the antenna at various orientations.

The far-field receive test configuration of FIG. 12 is very similar to the transmit configuration of FIG. 11, except that the RF switches of the array 50' are set to select the receive channel, the optical link to the far field horn is used to transmit the excitation signals for transmission by horn 134, and the elements 52 receive the transmitted excitation signals. The array receive output is then passed back to the network analyzer 150 via the F/O link 80 for analysis.

A wide band approach has been described to test the performance of the F/O array antenna. In accordance with one aspect of the invention, a short pulse is transmitted through the system, and the waveform received in the far field is analyzed. However, the pulse is not generated in real time; instead it is synthesized by the network analyzer with 400 frequencies over the 850–1400 MHz band. The method is also used to monitor and calibrate the time shift channels in the array antenna.

This invention will have a significant impact on the testing of those array antennas that have a wide instantaneous band width using TTD beamsteering. The ability to achieve non-invasive testing with a fiber optic delay line test target is a very cost effective technique. Also, using this calibration technique during actual operation of the array to determine individual channel failures will make this an extremely valuable testing method. This implies that the system does not have to be brought back to a depot to perform a maintenance check.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A method for testing a wide band microwave array antenna system operating over a frequency band, the array system comprising a true-time-delay (TTD) beamforming network, comprising:

transmitting a large number of test excitation signals at frequencies covering said frequency band within a short period of time through said array antenna system, to thereby synthesize a very short test excitation pulse;

measuring the system response to each of said test excitation signals and storing the system response data for each test excitation signal;

transforming said stored system response data for said test excitation signals into the time domain for analysis of a performance characteristic of said array antenna system.

2. The method of claim 1 further including the step of setting said TTD beamforming network to a predetermined beam pointing angle prior to said transmitting, measuring and transforming steps, to thereby demonstrate said performance characteristic of said system at said predetermined beam pointing angle.

3. The method of claim 1 wherein said transmitting step includes injecting said test excitation signals into a transmit signal input port of said array for transmitting said test excitation signals through a transmit signal path of said array system, and said test excitation signals are propagated through said transmit signal path and radiated from radiating elements comprising said array system.

4. The method of claim 3 wherein said measuring step includes receiving radiated test excitation signals in the far field of said array system, and collecting phase and amplitude information for each test signal.

5. The method of claim 1 wherein said test excitation signals are generated sequentially.

6. The method of claim 1 wherein said test excitation signals are radiated from a test excitation radiator in a far field of said array system, and said radiated signals are received at radiator elements comprising said array and transmitted through receive signal paths comprising said array to a receive output port comprising said array system.

7. The method of claim 1 wherein said performance characteristic is a range resolution characteristic of said system.

8. The method of claim 1 wherein said performance characteristic is a bandwidth characteristic of said system.

9. The method of claim 1 wherein said TTD network includes a plurality of variable time shift devices, and said performance characteristic is a functionality of said time shift devices.

10. The method of claim 1 wherein said TTD network includes a plurality of variable time shift devices, and said performance characteristic is a determination of the time delay introduced by each time shift device.

11. The method of claim 1 wherein said frequencies of said test excitation signals are equally spaced over said frequency band.

12. A method for testing a wide band microwave array antenna system operating over a frequency band, the array system comprising a plurality of true-time-delay (TTD) time shifters in a plurality of time shift channels, comprising:

transmitting a large number of test excitation signals at frequencies covering said frequency band through said time shift channels to thereby synthesize the generation of a very short pulse;

offsetting the arrival times of the signals through the time shift channels to maintain separation of the transmitted signals through the channel;

measuring the system response to each of said test excitation signals and storing the system response data for each test excitation signal;

transforming said stored system response data for each test excitation signal into the time domain, said transformed data indicating the relative time shift introduced by said time shift channels.

13. The method of claim 12 wherein said transmitting step includes injecting said test excitation signals into a transmit signal input port of said array for propagating said test excitation signals through transmit signal paths of said time shift channels, and said offsetting step includes collecting time delayed outputs of said time shift channels, wherein time delays in the collection of said outputs are predetermined and of different lengths for the respective time shift channels.

14. A wide band microwave array antenna system operating over a wide frequency band, comprising:

a plurality of true-time-delay (TTD) time shifters in a plurality of time shift channels, each channel having a channel output port;

a transmit feed network comprising an input port and a plurality of output ports for dividing a transmit excitation signal among said plurality of network output ports to distribute said signal among said time shift channels; and a signal collection network for collecting a portion of said excitation signals which have passed through said time shift channels, said collection network comprising a plurality of signal coupling devices for coupling off a portion of said excitation signals at each said channel output port, and a plurality of transmission lines connected in series with said respective coupling devices to provide said portion of said excitation signals at a collection port.

15. The system of claim 14 further comprising means for generating a large number of test excitation signals at equally spaced frequencies covering said frequency band to thereby synthesize the generation of a very short pulse, and means for injecting said large number of test excitation signals into said transmit network input port.

16. The system of claim 15 further comprising means for measuring the system response to each of said test excitation signals and storing the system response data for each test excitation signal, and means for transforming said stored system response data for each test excitation signal into the time domain, said transformed data indicating the relative time shift introduced by said time shift channels.

17. The method of claim 14 wherein said frequencies of said test excitation signals are equally spaced over said frequency band.

18. The system of claim 14 further comprising means for offsetting the arrival times of the coupled portions of said excitation signals through the time shift channels to maintain temporal separation of said coupled portions of said excitation signals at said collection port, said offsetting means comprising electrical lengths of said transmission lines, wherein propagation delays of lengths of said coupled portions of said signals provide said offsetting.

19. The system of claim 14 wherein said coupler devices comprise hybrid coupler devices.

20. The system of claim 14 wherein said signal collection network is reciprocal in operation, in that a receive test excitation signal injected into said collection port is divided among said channel output ports, and wherein said time shift channels are configurable into a receive configuration to pass signals injected into said channels output ports through respective receive channel paths comprising said time shift channels, said system further including receive network means for combining signals received at outputs of said receive paths at a receive network output port.

21. A wide band microwave array antenna system operating over a wide frequency band, comprising:

a plurality of true-time-delay (TTD) time shifters in a plurality of time shift channels, each channel having a channel input port and a channel output port;

a receive network comprising a plurality of input ports and an output port for combining signals received at said channel outputs into a combined signal at said device output port; and a test signal distribution network for distributing a portion of test excitation signals injected at a distribution input port among said plurality of input ports for said time shift channels, said distribution network comprising a plurality of signal coupling devices for coupling off a portion of said excitation signals at each said channel output port, and a plurality of transmission lines connected in series with said respective coupling devices.

22. The system of claim 21 further comprising means for generating a large number of test excitation signals at equally spaced frequencies covering said frequency band to thereby synthesize the generation of a very short pulse, and means for injecting said large number of test excitation signals into said distribution network input port.

23. The system of claim 22 further comprising means for measuring the system response to each of said test excitation signals and storing the system response data for each test excitation signal, and means for transforming said stored system response data for each test excitation signal into the time domain, said transformed data indicating the relative time shift introduced by said time shift channels.

24. The system of claim 21 further comprising means for offsetting the arrival times of the coupled portions of said excitation signals through the time shift channels to maintain temporal separation of said coupled portions of said excitation signals at said receive network output port, said offsetting means comprising electrical lengths of said transmission lines, wherein propagation delays of lengths of said coupled portions of said signals provide said offsetting.

25. The system of claim 21 wherein said coupler devices comprise hybrid coupler devices.

26. A method for testing a wide band microwave array antenna system operating over a frequency band, the array system comprising a true-time-delay (TTD) beamforming network, comprising:

transmitting a large number of test excitation signals at frequencies covering said frequency band within a short period of time through said array antenna system, to thereby synthesize a very short test excitation pulse;

receiving said test excitation signals at a far field location of said system and retransmitting a time delayed version of said received signals back to said antenna system;

using said antenna system in a receive configuration to receive said delayed version of said received signals;

measuring the antenna system response to said delayed version of said transmitted test excitation signals and storing the system response data for each such signal;

transforming said stored system response data into the time domain for analysis of a round trip performance characteristic of said antenna system.

27. The method of claim 26 wherein said step of receiving at said far field location and retransmitting a delayed version comprises:

positioning a signal transponder at said far field location, said transponder including a delay line for introducing a predetermined delay of sufficient length that returns from ground clutter and multipath sources is received at said array system well before said delayed version is received at said array system.

28. The method of claim 27 wherein said delay line includes a variable delay line for selectively introducing a short time delay, and said method includes conducting said analysis under the two conditions that said short time delay is included in said delay line and said short time delay is not included in said delay line, and said performance characteristic is a range resolution of said system.

29. The method of claim 27 wherein said signal transponder delay line includes a fiber optic delay line.

* * * * *